(12) United States Patent
Guo

(10) Patent No.: US 11,680,151 B2
(45) Date of Patent: Jun. 20, 2023

(54) POLYESTER TEXTILE WASTE RECYCLING

(71) Applicant: IKEA Supply AG, Pratteln (CH)

(72) Inventor: Zengwei Guo, Gothenburg (SE)

(73) Assignee: IKEA Supply AG, Pratteln (CH)

( * ) Notice: Subject to any disclaimer, the term of this patent is extended or adjusted under 35 U.S.C. 154(b) by 109 days.

(21) Appl. No.: 17/306,095

(22) Filed: May 3, 2021

(65) Prior Publication Data

US 2021/0261748 A1    Aug. 26, 2021

Related U.S. Application Data

(63) Continuation of application No. 16/487,280, filed as application No. PCT/EP2018/054044 on Feb. 19, 2018, now Pat. No. 11,021,589.

(30) Foreign Application Priority Data

Feb. 20, 2017  (EP) .................................... 17156887

(51) Int. Cl.
   *C08J 11/24*      (2006.01)
   *C08J 11/16*      (2006.01)
(52) U.S. Cl.
   CPC ............... *C08J 11/16* (2013.01); *C08J 11/24* (2013.01); *C08J 2367/02* (2013.01)
(58) Field of Classification Search
   CPC . C08J 11/16; C08J 11/242; C08J 11/24; C08J 2367/02
   USPC .......... 521/48; 528/190, 193, 194, 271, 272, 528/274; 428/364
   See application file for complete search history.

(56) References Cited

U.S. PATENT DOCUMENTS

| | | | | |
|---|---|---|---|---|
| 3,403,115 A | * | 9/1968 | Gruschke | ................. C08J 11/00 560/96 |
| 3,668,188 A | * | 6/1972 | King | .................... C08G 63/672 528/307 |
| 5,236,959 A | * | 8/1993 | Oakley | .................... C08J 11/24 524/34 |
| 6,706,843 B1 | | 3/2004 | Ishihara et al. | |
| 10,640,442 B2 | * | 5/2020 | Essaddam | ........... C07C 29/1285 |
| 2018/0215893 A1 | * | 8/2018 | Flynn | ....................... C08J 11/04 |
| 2019/0218362 A1 | * | 7/2019 | Barla | ...................... C07C 51/09 |

FOREIGN PATENT DOCUMENTS

| | | |
|---|---|---|
| JP | 2011098904 A | 5/2011 |
| JP | 2011173078 A | 9/2011 |
| JP | 2012131729 A | 7/2012 |
| JP | 2014070132 A | 4/2014 |
| WO | WO-2008/007384 A1 | 1/2008 |
| WO | WO-2017/007965 A1 | 1/2017 |

OTHER PUBLICATIONS

Hui Li et al. Applications of calcium oxideebased catalysts in biomass pyrolysis/gasification A review; Journal of Cleaner Production; vol. 291, Apr. 1, 2021, 125826 (Year: 2021).*
International Search Report PCT/ISA/210 for International Application No. PCT/EP2018/054044 dated Mar. 9, 2018.

* cited by examiner

*Primary Examiner* — Terressa Boykin
(74) *Attorney, Agent, or Firm* — Harness, Dickey & Pierce, P.L.C.

(57) ABSTRACT

A method for recovering natural fibers from a textile comprising polyester and natural fibers. The method comprises the steps of: providing said textile soaked in a mixture comprising a solvent and a catalyst, providing and maintaining a temperature of said mixture comprising said textile within a range of 80-240° C. during depolymerization of polyester in said textile; and recovering natural fibers after said depolymerization, wherein, in said step of providing said textile soaked in said mixture, said catalyst of said mixture comprises calcium oxide.

20 Claims, 4 Drawing Sheets

POLYESTER TEXTILE WASTE RECYCLING

CROSS-REFERENCE TO RELATED APPLICATIONS

This application is a continuation of U.S. application Ser. No. 16/487,280, filed Aug. 20, 2019, which is a national phase under 35 U.S.C. § 371 of PCT International Application No. PCT/EP2018/054044 which has an International filing date of Feb. 19, 2018, which claims priority to European Application No. 17156887.6, filed Feb. 20, 2017, the entire contents of each of which are hereby incorporated by reference.

TECHNICAL FIELD OF THE INVENTION

The present invention relates to a method for recycling polyester textile and use of a catalyst for recycling polyester textile.

BACKGROUND OF THE INVENTION

Various of polyester polymers, such as polyalkylene terephthalates, are commonly used in e.g. fibers due to for example their excellent chemical stability, fibers which may be used for manufacturing polyester textiles. Such textiles may be made from solely polyester fibers but they may be made from a mixture of fibers. For example, polyester textiles comprising both polyester and cotton fibers are commonly for clothes.

Large quantities of such polyester textiles is produced and consequently there is a large amount of polyester textile waste which needs to be recycled and/or reused. An efficient recycling would make it possible to successfully produce new polyester textile instead of using raw material (i.e. crude oil) to the same extent as before. The demand for recycled clothes is increasing due to our increasing awareness regarding sustainability.

However, to develop a practical system of recycling polyester textile waste is difficult. A big obstacle is impurities in textiles, such impurities may for example be dyes or other fibers such as cotton fibers. Mixing cotton and polyester fibers provides a textile having the advantages of both the cotton and the polyester. In addition, these fabrics have lower price than pure cotton fabrics. The most common cotton/polyester textiles comprise 65% cotton and 35% polyester, but textiles with 50% cotton and 50% polyester are also easy to find. Moreover, dyes are commonly used for giving the polyester textile its color. In order to achieve a good color fastness, a high amount of dye is incorporated into polyester fibers. For example, deep blue polyester fabric may contain pigments as much as 6 wt %.

Fibers from a polyester textile may directly be recovered, e.g. separated from other types of fibers in the textile, and subsequently be used for manufacturing a new polyester textile. A problem with reusing the fibers like this is that the polyester chains have degraded, i.e. they become shorter, during usage of the polyester textile. Since the reused fibers comprise shorter polyester chains they will be of a poorer quality than fibers with longer polyester chains and therefore the resulting textile will also be of a poorer quality.

Alternatively, the polyester textiles may be chemically recycled. This includes a depolymerization of the polyester in the textile. The polyester will then be depolymerized to its monomer, dimer and/or trimer units which may subsequently be repolymerized to longer polyester chains which can be used for producing new fibers and hence new polyester textile.

A problem with the current state-of-the-art is that the temperatures used for the depolymerization of polyester are high in order to achieve a high yield of the reaction. High temperature means that the energy demand for the depolymerization process is high, and thereby is also the cost of the process high. In addition, too high temperatures may be harmful for other types of fibers in the polyester textile, such as cotton fibers which may degrade during the depolymerization of the polyester. It is desired to improve the current state-of-the-art in order to lower the temperature of the depolymerization.

SUMMARY OF THE INVENTION

It is an object of the present invention to improve the current state of the art and to mitigate the above mentioned problem. This and other objects are achieved by a method for recycling polyester from a polyester textile and by use of a catalyst for depolymerization of polyester in a polyester textile as described herein.

According to a first aspect of the invention a method for recycling polyester from a polyester textile is provided. The method comprises the steps of:
  providing said polyester textile soaked and/or immersed in a heated mixture comprising a solvent and a catalyst wherein said catalyst comprises calcium oxide;
  maintaining said polyester textile in said heated mixture during depolymerization of polyester in said polyester textile.

According to at least one example embodiment of the invention during the step of maintaining said polyester textile in said heated mixture the heated mixture may have a temperature equal to or above the depolymerization temperature of the polyester in the polyester textile. The depolymerization temperature being 80° C., or 90° C., or 100° C., or 110° C., or 120° C., or 140° C., or 160° C., or 180° C.

It shall be understood that the step of maintaining said textile in said heated mixture comprises e.g. that the mixture heated to the depolymerization temperature or a higher temperature and maintained at this temperature during the depolymerization but also that the mixture is heated to the depolymerization temperature and that the temperature is thereafter lowered where after the temperature is raised to the depolymerization temperature or above. This lowering and raising of the temperature may be repeated one or more times.

According to a second aspect of the invention a method for recycling polyester from a polyester textile is provided. The method comprises the steps of:
  providing said polyester textile soaked and/or immersed in a mixture comprising a solvent and a catalyst;
  providing and maintaining a temperature of said mixture comprising said polyester textile within a range of 80-240° C. during depolymerization of polyester in said polyester textile;
  wherein, in said step of providing said polyester textile soaked and/or immersed in said mixture, said catalyst of said mixture comprises calcium oxide.

This method provides a depolymerization of polyester at a lower temperature as compared with the current state-of-the-art due to the catalyst which is used in the method. Depolymerization at lower temperatures facilitates for a more sustainable recycling of polyester textiles, i.e. a more environmental friendly process, since the energy demand of the process may be decreased. Decreasing the required amount of energy may lead to a reduced cost for the recycling process. The catalyst used herein will depolymerize polyester to smaller molecules, e.g. to its monomers, dimers and trimers which may be referred to as the reaction products. These smaller molecules may after the depolymerization be repolymerized to polyester which may be used to produce a new polyester textile.

It shall be understood that the step of maintaining a temperature of said mixture comprises e.g. that the mixture heated to said temperature which may be referred to as the depolymerization temperature or a higher temperature but also that the mixture is heated to the depolymerization temperature and that the temperature is thereafter lowered below the depolymerization temperature and thereafter raised again to the depolymerization temperature or above. This lowering and raising of the temperature may be repeated one or more times.

Embodiments mentioned below are compatible with both the first and the second aspect of the invention.

According to at least one example embodiment of the invention at least a part of the smaller molecules will be dissolved in the solvent. In other words, the monomers, dimers and trimers may partially be dissolved in the solvent. This solution may be referred to as the liquid fraction. The catalyst and optionally any undepolymerized polyester and/or any further solid material may be referred to as the solid fraction.

According to at least one example embodiment of the invention prior to the step of providing the polyester textile soaked and/or immersed in a mixture a large piece of polyester textiles may be divided to smaller pieces. The pieces may then be soaked and/or immersed in a mixture containing the solvent and the catalyst. By soaking it means that the pieces of textile are surrounded by the solvent and catalyst. In relation to this invention the term "providing the polyester textile soaked in a mixture" means that the polyester textile is surrounded and/or immersed by the mixture. Thus, the term "providing the polyester textile soaked in a (heated) mixture comprising a solvent and a catalyst" means that the polyester textile is surrounded and/or immersed and/or covered by said mixture so that said mixture/catalyst can act at least on the surface of said textile and make it depolymerize. According to one example, said textile is depolymerized layer by layer or surface portion by surface portion—i.e. when the top surface or top layer has been depolymerized the mixture reaches a new surface portion (replacing the previous surface portion) or the next layer, which is now depolymerized.

According to at least one example embodiment of the invention the mixture comprising polyester textile 0.2-10 wt % catalyst, or 0.2-6 wt % catalyst, or 1-4 wt % catalyst. Additionally, or alternatively, the mixture comprising the polyester textile comprises at least 0.2 wt % catalyst, or at least 1 wt % catalyst, or at least 2 wt % catalyst. Additionally, or alternatively, the mixture comprising the polyester textile comprises at most 10 wt % catalyst, or at most 6 wt % catalyst, or at most 4 wt % catalyst, or at most 2 wt % catalyst. The amount of catalyst is calculated as compared with the amount of polyester in the polyester textile. For example, using 2 wt % of catalyst results in that 0.12 g catalyst is used if there is 6 g polyester in the polyester textile.

According to at least one example embodiment the solvent may act as a reactant in the depolymerization reaction. Additionally, or alternatively, the mixture may comprise an additional reactant needed for the depolymerization reaction.

According to at least one example embodiment of the invention said step of maintaining a temperature of said mixture comprising polyester textile lasts until at least 20% of the polyester in said polyester textile is depolymerized to molecules with a molecular weight lower than 600 g/mol, or at least 50% of the polyester in said polyester textile is depolymerized to molecules with a molecular weight lower than 600 g/mol, or at least 80% of the polyester in said polyester textile is depolymerized to molecules with a molecular weight lower than 600 g/mol.

According to at least one example embodiment of the invention said method further comprises the step of:

recovering of said molecules with a molecular weight lower than 600 g/mol.

According to at least one example embodiment of the invention the recovering may comprise one or several sub-steps. Examples of such sub-steps are precipitation, filtration, extraction, soxhlet extraction, distillation. These sub-steps may be combined in various ways in order to recover the molecules with a molecular weight lower than 600 g/mol.

According to at least one example embodiment of the invention the depolymerization products may be e.g. monomer, dimers and trimers of the polyester in the polyester textile.

According to at least one example embodiment of the invention, the maintaining of the temperature in the step of maintaining the temperature of the mixture comprising polyester textile lasts until 20-100% of the polyester in said polyester textile is degraded, or until 35-80% of the polyester in said polyester textile is degraded, or until 50-70% of the polyester in said polyester textile is degraded. Additionally, or alternatively the step of maintaining the temperature of the mixture comprising polyester textile lasts until at least 20%, or until at least 30%, or until at least 40%, or until at least 50% of the polyester in said polyester textile is degraded. Additionally, or alternatively the step of maintaining the temperature of the mixture comprising polyester textile lasts until at most 99%, or at most 90%, or at most 80%, or at most 70%, or at most 60%, or at most at most 50% of said polyester in said polyester textile is degraded.

The fraction of polyester in the polyester textile which has degraded may be referred to as the degradation efficiency (E). This efficiency may be calculated from the weight of the solid fraction. Since the catalyst is not consumed during the reaction the weight of the catalyst comprised in the mixture from start is the same as the weight of catalyst in the solid fraction after depolymerization it may be removed from the total weight of the solid fraction in order to calculate the amount of undepolymerized polyester. The depolymerization efficiency (E) may then be calculated according to:

$$E = \frac{\text{amount of polyester in the textile} - \text{the amount of undepol. polyester}}{\text{amount of polyester in the textile}}$$

According to at least one example embodiment of the invention said temperature or depolymerization temperature is within the range of 80-170° C., or within the range of 100-150° C. The lower temperature that is used, the lower is the amount of energy needed for the reaction.

According to at least one example embodiment the temperature is in the range of 80-200° C., or it is in the range 80-180° C., or it is in the range 80-160° C., or it is in the range of 80-140° C., or in the range of 80-120° C., or in the range of 80-100° C. Additionally, or alternatively, the temperature may be above 80° C., or above 90° C., or above 100° C., or above 110° C., or above 120° C., or above 140° C., or above 160° C., or above 180° C. Additionally or alternatively, the temperature may be lower than 200° C., or lower than 180° C., or lower than 160° C., or lower than 140° C., or lower than 120° C., or lower than 100° C.

According to at least one example embodiment of the invention the method according to any one of the preceding claims, wherein, in said step of maintaining said temperature of said mixture comprising said polyester textile, said temperature is maintained for 10-300 min, or for 30-240 min, or for 60-120 min.

According to at least one example embodiment the temperature is maintained for at least 10 min, or at least 20 min, or at least 30 min, or at least 40 min, or at least 50 min, or at least 60 min. Additionally, or alternatively the temperature is maintained for at most 300 min, or at most 270 min, or at most 240 min, or at most 200 min, or at most 160 min, or at most 120 min, or at most 90 min, or at most 60 min. For example, the temperature may be maintained for 20-160 min, or it may be maintained for 50-200 min.

According to at least one example embodiment of the invention said solvent comprises an alcohol or a diol. The alcohol may serve as a reactant in the depolymerization reaction.

According to at least one example embodiment of the invention the solvent may be a linear or a branched alcohol or diol.

According to at least one example embodiment of the invention the alcohol may be chosen from a list comprising but not limited to: methanol, ethanol, propanol, butanol, pentanol, hexanol, heptanol or any other alcohol comprising a carbon chain with more than eight carbons. An alcohol comprising a short carbon chain is more reactive than an alcohol comprising a longer carbon chain, i.e. methanol will be the most reactive alcohol.

According to at least one example embodiment of the invention the diol may be chosen from a list comprising but not limited to: ethylene glycol, propandiol or butanediol or any other diol comprising a carbon chain with more than four carbons.

According to at least one example embodiment of the invention the said mixture comprises solely one alcohol or diol as solvent. In such an embodiment the depolymerization reaction and product purifications may occur in a water-free environment.

According to at least one example embodiment of the invention the alcohol could have also other functional groups, such as an amino group or a primary amine.

According to at least one example embodiment of the invention said polyester textile comprises at least 10% polyester, or at least 25% polyester, or at least 50% polyester, or at least 75% polyester or wherein said polyester textile comprises 100% polyester.

According to at least one example embodiment of the invention the polyester textile comprises at least 10% polyester, or at least 25% polyester, or at least 35% polyester, or at least 50% of polyester, or at least 70% polyester, or at least 80% polyester, or at least 90% polyester. Additionally, or alternatively, the polyester textile comprises at most 90% polyester, or at most 80% polyester, or at most 70% polyester, or at most 50% polyester, or at most 30% polyester. For example, the polyester textile may comprise 25-70% polyester, or it may comprise 35-80% polyester.

According to at least one example embodiment of the invention, said polyester textile further comprise natural fibers and/or additional synthetic fibers, wherein said natural fibers for example are e.g. cotton fibers, viscose fibers, cellulose fiber or regenerated cotton fibers and wherein said synthetic fibers for example are elastane fibers.

According to at least one example embodiment of the invention the method as described herein may allow for recovering the natural fiber from the polyester fabric. Maintaining the mixture comprising the polyester textile at as low temperature as possible is advantageous as it does not degrade the natural fiber, e.g. a cotton fiber, as much as it may degrade at higher temperatures. Hence, cotton fibers with higher molecular weight distribution is preserved after the reaction. Such cotton fibers having a higher molecular weight distribution is easier to use for regeneration of cotton fibers, e.g. to produce a new textile. In addition, the regenerated cotton fibers may be stronger and consequently any textile produced from these fibers may have a higher quality.

According to at least one example embodiment of the invention the regenerated cotton fiber may for example be a lyocell type fiber.

According to at least one example embodiment of the invention the polyester textile may comprise further comprise yet another material, e.g. elastane. Elastane may also be separated using the method as described herein.

According to at least one example embodiment of the invention the natural fiber and/or any other material comprised in the polyester textile may be a part of the solid fraction achieved after the depolymerization reaction. Hence, the weight of this material may also be subtracted from the total weight of the solid fraction in order to calculate the depolymerization efficiency as described above.

According to at least one example embodiment of the invention the polyester textile may further comprises a dye, e.g. pigments or coloring agents. The dye may be recovered and reused in new textiles.

According to at least one example embodiment of the invention said polyester is aromatic polyester or an aliphatic polyester, e.g. a polyalkylene terephthalate; and wherein said depolymerized polyester comprises at least one of dimethyl terephthalate, ethylene glycol, 1,3-propanediol, 1,4-butanediol, ethyl methyl terephthalate, dimers of the aromatic polyester, and trimers of aromatic polyester.

According to at least one example embodiment the aromatic polyester may be polyethylene terephthalate (PET), or it may be polytrimethylene terephthalate (PTT), or it may be polybutylene terephthalate (PBT), or it may be an aliphatic polyester such as polylactic acid (PLA).

According to at least one example embodiment of the invention said catalyst further comprises an oxide of any metal from group 2 of the periodic table, or an oxide of any metal from the lanthanides. Hence, the catalyst may be a mixed oxide. An oxide comprising any metal from group 2 of the periodic table shows a strong alkalinity and hence these oxides enhance the catalyzation of the depolymerization. An oxide comprising a metal from the lanthanides the will also enhance the catalyzation of the depolymerization, and in addition such oxide may increase the life time of the catalyst.

According to at least one example embodiment of the invention said catalyst is an oxide written on the general formula CaO-xO-yO, where x is chosen from group 2 of the periodic table and where y is chosen from the lanthanides.

According to at least one example embodiment the catalyst may be CaO—MgO—CeO$_2$. The ratio may be 1:4:1, i.e. the catalyst used may be 1CaO-4MgO-1CeO$_2$.

According to at least one example embodiment of the invention said depolymerization is performed in an autoclave.

According to at least one example embodiment of the invention the depolymerization is performed in an autoclave preferably at 1-6 bar.

According to at least one example embodiment of the autoclave is filled with an inert gas, e.g. nitrogen or argon, prior the depolymerization. The autoclave may be filled with such inert gas prior pressurizing the autoclave.

According to at least one example embodiment of the invention said method further comprises the step of:

Recovering of said at least one of dimethyl terephthalate, ethylene glycol, 1,3-propanediol, 1,4-butanediol, ethyl methyl terephthalate, dimers of aromatic polyester, and trimers of an aromatic polyester.

According to at least one example embodiment of the invention the recovering may comprise one or several sub-steps. Examples of such sub-steps are precipitation, filtration, extraction, soxhlet extraction, distillation. These sub-steps may be combined in various ways in order to recover at least one of dimethyl terephthalate, ethylene glycol, 1,3-propanediol, 1,4-butanediol, ethyl methyl terephthalate, dimers of aromatic polyester, and trimers of aromatic polyester.

According to at least one example embodiment of the invention the mixture is cooled in order to let some of the reaction products e.g. dimethyl terephthalate, dimers and trimers to precipitate before the filtration. By this precipitation these reaction products may become a part of the solid fraction.

According to at least one example embodiment of the invention the mixture is first cooled allowing some of the reaction products to precipitate. The liquid fraction may subsequently be separated from the solid fraction via filtration. The recovering of at least one of dimethyl terephthalate, ethylene glycol, 1,3-propanediol, 1,4-butanediol, ethyl methyl terephthalate, dimers of aromatic polyester, and trimers of aromatic polyester may subsequently be done via extraction and/or soxhlet extraction of the solid fraction using methanol. This will e.g. separate some of the monomers, dimers and trimers from each other as well as from the catalyst. Additionally, or alternatively, the ethylene glycol may be separated from the solvent by distillation if the solvent is another alcohol or diol than ethylene glycol. If ethylene glycol is used as the solvent of reaction this step of the recovering is unnecessary.

According to at least one example embodiment of the invention the method may further comprise the step of recovering any component of the polyester textile, e.g. dye, natural fibers, elastane fibers or depolymerized elastane.

According to at least one example embodiment of the invention the recovering of at least one of dimethyl terephthalate, ethylene glycol, 1,3-propanediol, 1,4-butanediol, ethyl methyl terephthalate, dimers of aromatic polyester, and trimers of aromatic polyester and the recovering of any component of the polyester textile may be done simultaneously. Hence, the same steps may be used for recovering of both.

According to at least one example embodiment of the invention the recovering of any component of the polyester textile may comprise one or several sub-steps. Examples of such sub-steps are precipitation, filtration, extraction, soxhlet extraction, distillation. These sub-steps may be combined in various ways in order to recover any component of the polyester textile.

According to at least one example embodiment of the invention the dye may be recovered by e.g. filtration and distillation or extraction and distillation process. The dye may be fully or partially soluble in the solvent which is used in the mixture in which the polyester textile is soaked. If so, the solid fraction, e.g. undepolymerized polymer and catalyst, is removed by filtration and subsequently the dye may be recovered by removing the solvent by distillation. Additionally, or alternatively, the dye may be insoluble in the solvent. The dye would then be a part of the solid fraction and collected by filtration. A solvent in which the dye is soluble may then be used to separate the dye from the rest of the solid fraction.

According to a third aspect of the invention use of a catalyst for depolymerization of polyester in a polyester textile is provided. The catalyst comprises calcium oxide.

Effects and features of this third aspect of the present invention are most analogous to those described above in connection with the first and the second aspect of the inventive concept. Embodiments and examples mentioned in relation to the first and the second aspect of the present invention are largely compatible with the third aspect of the invention.

According to at least one example embodiment of the invention said catalyst further comprises an oxide of any metal from group 2 of the periodic table, or an oxide of any metal from the lanthanides.

According to at least one example embodiment of the invention said catalyst is an oxide written on the general formula CaO-xO-yO, where x is chosen from group 2 of the periodic table and where y is chosen from the lanthanides.

According to at least one example embodiment the catalyst may be CaO—MgO—CeO$_2$. The ratio may be 1:4:1, i.e. the catalyst used may be 1CaO-4MgO-1CeO$_2$.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF THE DRAWINGS

In the present detailed description, embodiments of the present invention will be discussed with the accompanying figures. It should be noted that this by no means limits the scope of the invention, which is also applicable in other circumstances for instance with other types or variants of methods for recycling polyester from a polyester textile than the embodiments shown in the appended drawings. Further, that specific features are mentioned in connection to an embodiment of the invention does not mean that those components cannot be used to an advantage together with other embodiments of the invention.

Figure 1:
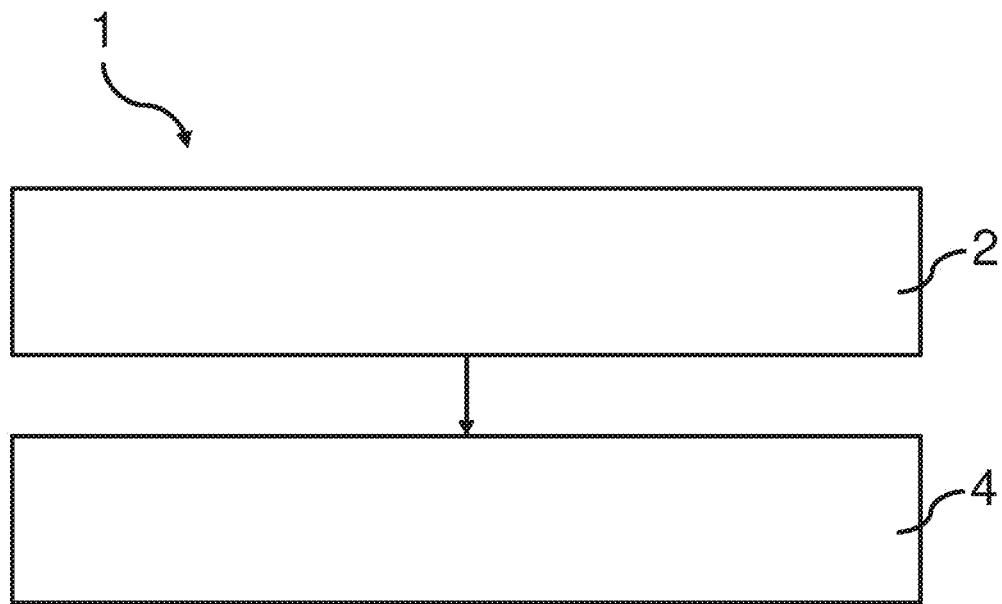
FIG. 1 shows a schematic view of the method in accordance with at least one embodiment of the invention.

FIG. 1 shows a schematic view of a method 1 for recycling polyester from a polyester textile. The method comprises two steps 2, 4. The first step comprising providing a polyester textile soaked in a mixture comprising a solvent and a catalyst. The second step 4 comprises providing and maintaining a temperature of the mixture within a range of 80-240° C. during depolymerization of polyester in the polyester textile. For example, the temperature which is provided and maintained may be 100° C., or 120° C., or 150° C., or 170° C. The temperature is according to at least one example embodiment maintained until at least 20% of the polyester in the polyester textile is depolymerized to molecules with a molecular weight lower than 600 g/mol. In other embodiments the temperature is maintained until at least 50% or at least 80% of the polyester in said polyester textile is depolymerized to molecules with a molecular weight lower than 600 g/mol. The temperature may e.g. be maintained for 10-300 min.

The polyester textile may comprise at least 10%, or 25%, or 50% or 75% of polyester and it may further comprise a natural fiber, e.g. cotton, regenerated cotton or viscose. Alternatively, the polyester textile may also comprise 100% polyester fibers. The polyester may for example be an aromatic polyester, such as a polyalkylene terephthalate. Examples of such polyalkylene terephthalate is polyethylene terephthalate, polytrimethyl terephthalate and polybutylene terephthalate. The catalyst comprises calcium oxide. It may for example be CaO, or it may be $CaO-CeO_2$, or it may be $CaO-MgO-CeO_2$. In the latter case the ration may be 1:4:1, i.e. the catalyst used may be $1CaO-4MgO-1CeO_2$. The solvent may comprise an alcohol or a diol.

Figure 2:
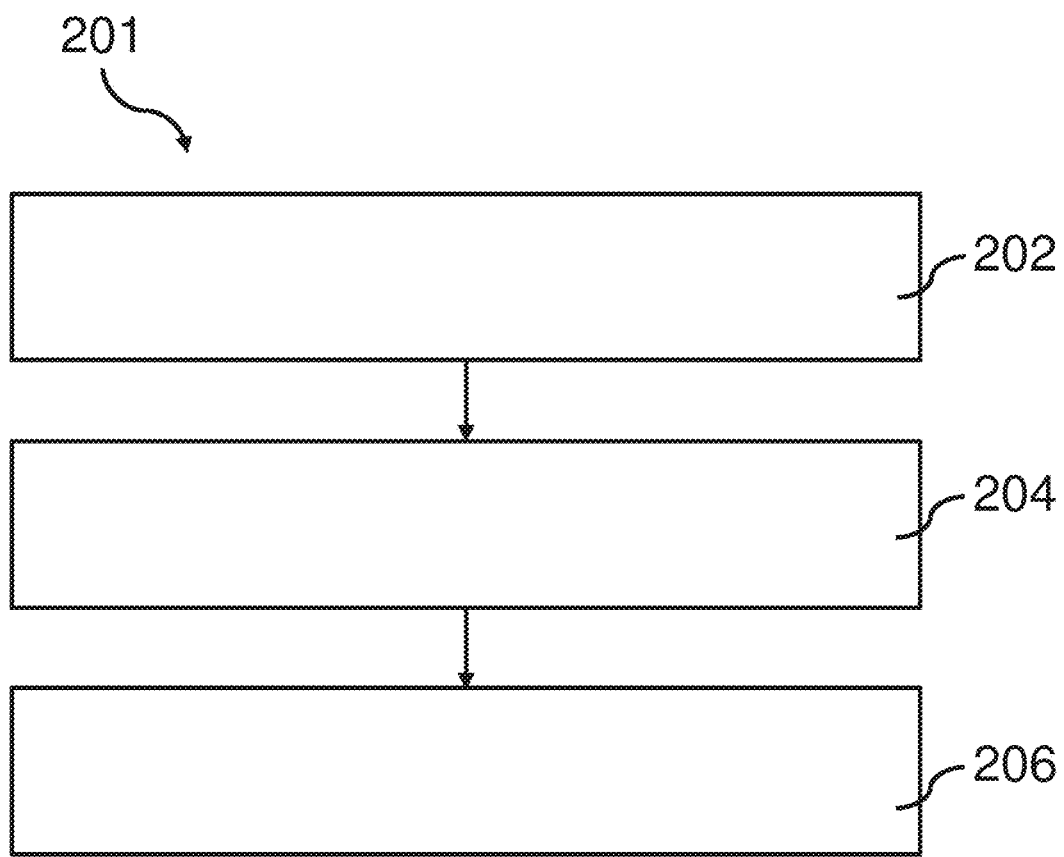
FIG. 2 shows a schematic view of the method in accordance with at least one embodiment of the invention.

FIG. 2 shows a schematic view of a method 201. The two first steps 202, 204 of the method 201 in FIG. 2 are the same as the two steps 2, 4 of the method 1 in FIG. 1. Hence, focus on the description related to FIG. 2 will be on the differences compared to the method 1 of FIG. 1.

The method 201 has a third step 206, which comprises recovering of said at least one of dimethyl terephthalate, ethylene glycol, 1,3-propanediol, 1,4-butanediol, ethyl methyl terephthalate, dimers of aromatic polyester, and trimers of aromatic polyester. The third step 206 may also comprise recovering of any dye, any natural fiber e.g. cotton and/or any additional component e.g. elastane. This step may be divided into one or several sub-steps. Examples of such sub-steps are precipitation, filtration, extraction, soxhlet extraction, distillation. These sub-steps may be combined in various ways in order to recover any component of the polyester textile. In addition, the third step may comprise recovering of any natural fiber, any further material and/or any dye which may be present in the polyester textile.

Figure 3:
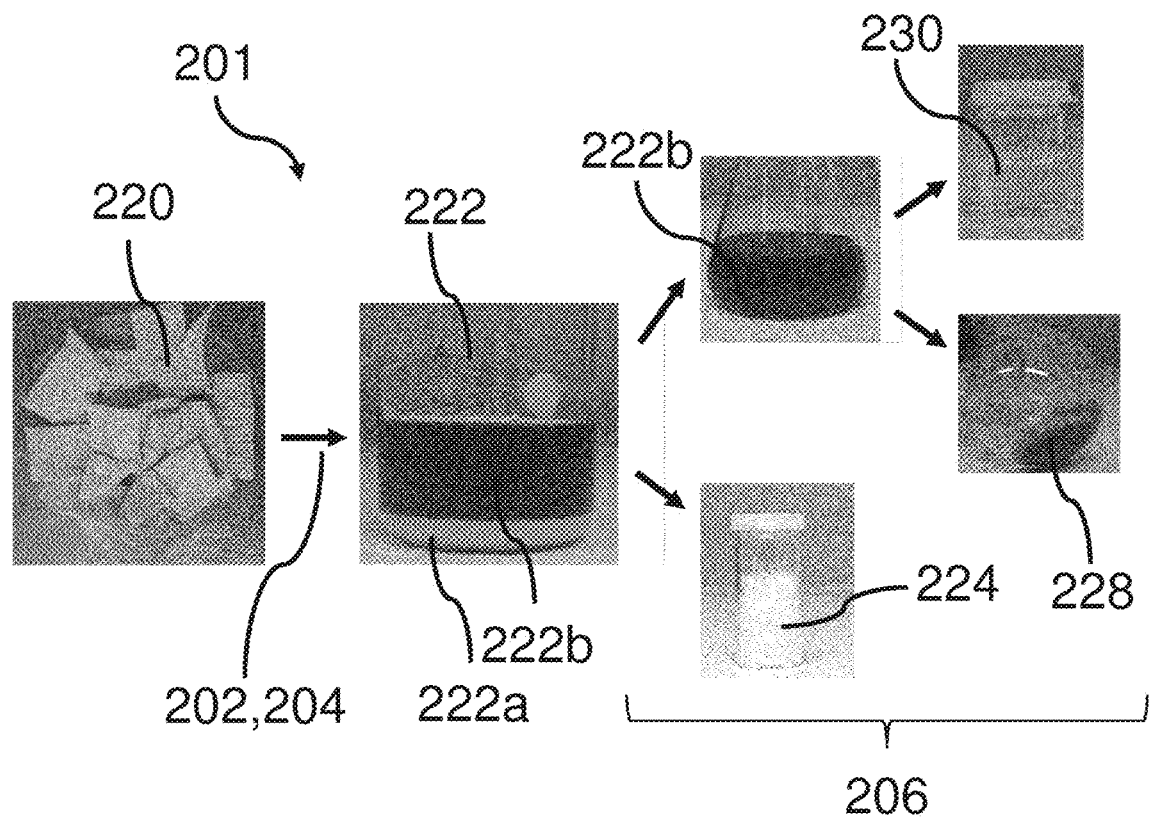
FIG. 3 shows photographs of the different steps comprised in the method in accordance with at least one embodiment of the invention.

FIG. 3 shows photographs visualizing the different steps of method 201. In this example embodiment the polyester textile 220 comprises polyethylene terephthalate (PET) and a dye. During the depolymerization the polyethylene terephthalate will depolymerize into its monomers, i.e. dimethyl terephthalate and ethylene glycol as well as dimers and trimers of the polyester. The textile 220 is soaked in a mixture comprising a solvent and a catalyst. In other words, the polyester textile is provided soaked in a mixture comprising a solvent and a catalyst 202. Subsequently, a temperature will be provided and maintained during depolymerization of polyester in the polyester textile 204. After depolymerization the reaction mixture 222 contains a solid fraction 222a and a liquid fraction 222b. The reaction mixture 222 will subsequently go through the third step 206 of the method in order to recover reaction products, dye and solvent. This third step 206 is divided into several sub-steps. After the reaction the reaction mixture may be cooled for precipitating some of the reaction products, e.g. dimethyl terephthalate as well as dimers and trimers of the polyester such that they become a part of the solid fraction. Hence, after precipitation the solid fraction 222a comprises the precipitated reaction products, the catalyst and undepolymerized polyester if present. The liquid fraction 222b comprises the solvent, dye and ethylene glycol. The liquid fraction 222b will be separated from the solid fraction via filtration. The solid fraction will undergo extraction or soxhlet extraction 206b using methanol such that dimethyl terephthalate 224 is recovered and separated from the remaining solid fraction. This liquid fraction 222b comprises dye, ethylene glycol and methanol and is subsequently or simultaneously distilled 206c. During distillation 206c, ethylene glycol 230 is recovered and separated from a solution comprising methanol and dye. The methanol may be evaporated 206d in order to recover the dye 228.

Figure 4:
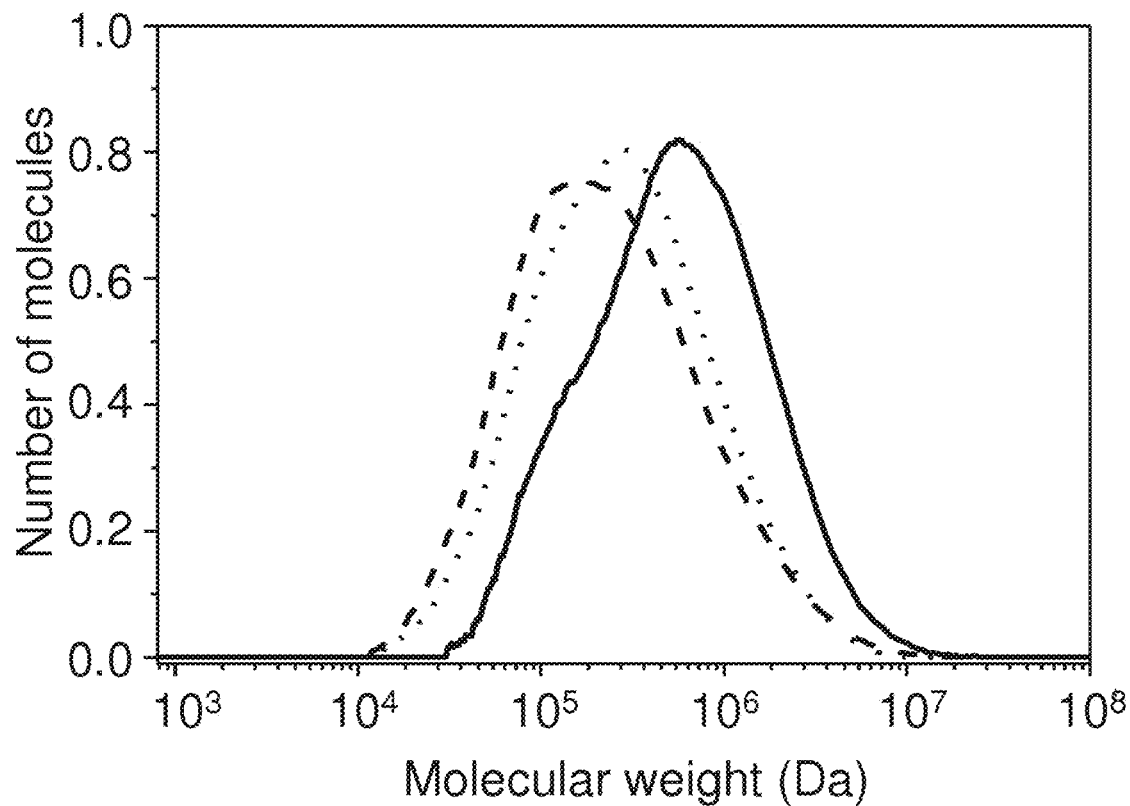
FIG. 4 shows graphs of the molecular weight distribution of cotton before and after depolymerization of polyester in accordance with at least one example embodiment of the invention.

FIG. 4 shows the molecular weight of cotton present in the polyester textile before (solid line) and after depolymerization of polyester at 165° C. (dotted line) and at 190° C. (dashed line). The graph shows that a lower temperature for depolymerization does not affect, i.e. lower, the molecular weight distribution of the cotton fraction of the polyester textile as much as a higher temperature. Hence, it is favorable to be able to keep the temperature which is maintained during depolymerization as low as possible.

The skilled person realizes that a number of modifications of the embodiments described herein are possible without departing from the scope of the invention, which is defined in the appended claims. For instance, textiles of different compositions or different polyesters may be recycled using this method.

EXAMPLES

Several catalysts were tested at different temperatures in order to find a catalyst working at low temperature.

Table 1 indicates which catalyst that were working at the different temperatures. In table 1, x means that the catalyst does not work and ✓ means that the catalyst work. It shall be understood, the by working it means that the catalyst will trigger the depolymerization of the polyester in the polyester textile.

| Name | Low temperature <160° C. | Medium temperature 160-200 | High temperature >200 |
|---|---|---|---|
| $Al_2O_3$ | x | X | x |
| $Fe_3O_4$ | x | X | x |
| CaO | ✓ | ✓ | ✓ |
| MgO | x | X | ✓ |
| $CeO_2$ | x | X | ✓ |
| $CaO-CeO_2$ | ✓ | ✓ | ✓ |
| $MgO-CeO_2$ | x | X | ✓ |
| $1CaO-4MgO-1CeO_2$ | ✓ | ✓ | ✓ |
| $4MgO-CeO_2-Fe_3O_4$ | x | X | ✓ |
| $4MgO-PrOx-CeO_2$ | x | X | ✓ |

From this first screening of temperatures the three catalysts: CaO, $CaO-CeO_2$ and $CaO-4MgO-1CeO_2$, which were working were further tested at even lower temperatures (cf. Example 1-8 below). Table 3 shows results from these tests.

Example 1

A mixture of 6 g of polyethylene terephthalate (PET) fiber soaked of 60 ml methanol and 0.12 g of CaO were put in an autoclave. The autoclave was heated to and maintained at 80° C. during the depolymerization. After 14 h, the autoclave was quenched to room temperature by cold water allowing precipitation of dimethyl terephthalate (DMT) as well as dimers and trimers of the polyester. The liquid fraction was separated from the solid fraction by filtration. 3.11 g of DMT was extracted from the solid fraction by methanol. Methanol and ethylene glycol were recovered by distillation of the liquid fraction.

Example 2

A mixture of 6 g of PET-fiber soaked 60 ml methanol and 0.12 g of a CaO—$CeO_2$ mixed oxide were put in an autoclave. The autoclave was heated to and maintained at 100° C. during the depolymerization. After 4.5 h, the autoclave was quenched to room temperature by cold water allowing precipitation of DMT as well as dimers and trimers of the polyester. The liquid fraction was separated from the solid fraction by filtration. 4.07 g of DMT was extracted from the solid fraction by methanol. Methanol and ethylene glycol were recovered by distillation of the liquid fraction.

Example 3

A mixture of 6 g of PET fiber soaked in 60 ml of methanol and 0.12 g of a 1CaO-4MgO-1$CeO_2$ mixed oxide were put in an autoclave. The autoclave was heated to and maintained at 135° C. After 4.5 h, the autoclave was quenched to room temperature by cold water allowing precipitation of DMT as well as dimers and trimers of the polyester. The liquid fraction was separated from the solid fraction by filtration. 4.61 g of DMT was extracted from the solid fraction by methanol. Methanol and ethylene glycol were recovered by distillation of the liquid fraction.

Example 4

A mixture of 6 g of PET fiber soaked in 60 ml methanol and 0.12 g of a 1CaO-4MgO-1$CeO_2$ mixed oxide were put in an autoclave. The autoclave was heated to and maintained at 165° C. during the depolymerization. After 2 h, the autoclave was quenched to room temperature by cold water. The reaction mixture was put in freezer for 1 h in order to further precipitate DMT as well as dimers and trimers of the polyester. The liquid fraction was separated from the solid fraction by filtration. 5.31 g of DMT was extracted from the solid fraction by methanol. The methanol and ethylene glycol was recovered by distillation.

Example 5

A mixture of 8 g of PET textile waste with different colors soaked in 60 ml methanol and 0.12 g of a 1CaO-4MgO-1$CeO_2$ mixed oxide were put in an autoclave. The autoclave was heated to and maintained at 165° C. during the depolymerization. After 2 h, the autoclave was quenched to room temperature by cold water. The reaction mixture was put in freezer for 1 h to further precipitate DMT as well as dimers and trimers of the polyester. The liquid fraction was separated from the solid fraction by filtration. DMT was extracted from the solid fraction by methanol. The extracted DMT was further purified by distillation to generate a higher purity. The liquid fraction comprising methanol, ethylene glycol and dye was distilled.

Example 6

A mixture of 6 g of PET textile waste with one color soaked in 60 ml methanol and 0.12 g of a 1CaO-4MgO-1$CeO_2$ mixed oxide were put in an autoclave. The autoclave was heated to and maintained at 165° C. during the depolymerization. After 2 h, the autoclave was quenched to room temperature by cold water. The reaction mixture was put in freezer for 1 h to further precipitate DMT as well as dimers and trimers of the polyester. The liquid fraction was separated from the solid fraction by filtration. DMT was extracted from the solid fraction by methanol. The extracted DMT was further purified by recrystallization to generate a higher purity. The liquid fraction comprising methanol, ethylene glycol and dye was distilled.

Example 7

10 g of white PET/cotton mixed textile waste with a weight ratio of 1:1 (PET to cotton) soaked in 100 ml methanol and 0.2 g of a 1CaO-4MgO-1$CeO_2$ mixed oxide were put in an autoclave. The autoclave was heated to and maintained at 165° C. during the depolymerization. After 2 h, the autoclave was quenched to room temperature by cold water allowing for precipitation of DMT as well as dimers and trimers of the polyester. The liquid fraction was separated from the solid fraction by filtration. Here, the solid fraction mainly contains DMT and cotton. DMT was extracted from solid fraction by methanol. The remaining cotton was then dried at 35° C. overnight. The dried cotton can be reused through a wet-spinning process to produce regenerated cellulose fiber. Table 2 shows the mechanical properties of regenerated cotton fiber made from the recovered cotton. The methanol and ethylene glycol in liquid phase was recovered by distillation.

Table 2 shows mechanical properties of regenerated cotton fiber produced through a lyocell spinning process.

|  | Dry measurement | Wet measurement |
| --- | --- | --- |
| Titer, dtex | 8.63 | 8.52 |
| Tenacity, cN/dtex | 3.68 | 2.93 |

Example 8

A mixture of 4.8 g PET fiber mixed with 1.2 g spandex fiber soaked in 60 ml methanol and 0.2 g of a 1CaO-4MgO-1$CeO_2$ mixed oxide were put in an autoclave. The autoclave was heated to and maintained at 165° C. during the depolymerization. After 2 h, the autoclave was quenched to room temperature by cold water allowing precipitation of DMT as well as dimers and trimers of the polyester. The liquid fraction was separated from the solid fraction by filtration. Here, the solid fraction mainly contains DMT and depolymerized spandex fraction which is not soluble in methanol. DMT was extracted from the solid fraction by methanol and then purified by a distillation to generate higher purity.

The liquid fraction comprising methanol, ethylene glycol and polyether from depolymerized spandex was separated by distillation.

Example 9

6 g of PET fiber, 30 ml of ethanolamine and 0.12 g of $1CaO.4MgO.1CeO_2$ mixed oxide were put in an autoclave. The autoclave was heat up to 115° C. and kept it at 115° C. during the depolymerization. After 2 h, the autoclave was quenched to room temperature by cold water. The reaction products in the reactor were mixed with 150 ml of hot deionised water. The obtained slurry from reactor was heated up to the boiling point and then filtered immediately. The filtrate from filtration was kept in 4° C. overnight. During the storage time, the bis(2-hydroxyethyl) terephthalamide (BHETA) crystallized in the filtrate. The PET was completely depolymerized and around 5.6 g of BHETA was obtained.

Example 10

6 g of Polylactic acid (PLA) pellets, 60 ml of methanol and 0.12 g of $1CaO.4MgO.1CeO_2$ mixed oxide were put in an autoclave. The autoclave was heat up to 175° C. and kept it at 175° C. during the depolymerization. After 2 h, the autoclave was quenched to room temperature by cold water. The reaction mixture was separated by filtration. The PLA was completely depolymerized. The filtrate from filtration was distilled to remove methanol. After distillation, 4.25 g of methyl lactate was obtained.

Example 11

6 g of Polytrimethylene terephthalate (PTT) fiber, 60 ml of methanol and 0.12 g of $1CaO.4MgO.1CeO_2$ mixed oxide were put in an autoclave. The autoclave was heat up to 175° C. and kept it at 175° C. during the depolymerization. After 2 h, the autoclave was quenched to room temperature by cold water. The reaction mixture was separated by filtration. PTT was completely depolymerized and 2.6 g of DMT was extracted from solid fraction by methanol. The liquid fraction was distilled and got methanol and 1,3-Propanediol. The obtained methanol will be recycled.

Table 3 shows the depolymerization efficiency and the yield of extracted DMT using different catalyst at different temperatures.

| Reaction temperature 80° C. | | |
|---|---|---|
| | CaO | $CaO\text{-}CeO_2$ |
| Depolymerization efficiency | 58.5% | 43.6% |
| Yield of Extracted DMT | 51.8% | 18.7% |
| Reaction temperature 100° C. | | |
| | $CaO\text{-}CeO_2$ | $1CaO\text{-}4MgO\text{-}1CeO_2$ |
| Depolymerization efficiency | 83.5% | 46.6% |
| Yield of Extracted DMT | 67.8% | 32.6% |
| Reaction temperature 135°C | | |
| | CaO | $CaO\text{-}CeO_2$ | $1CaO\text{-}4MgO\text{-}1CeO_2$ |
| Depolymerization efficiency | 100% | 100% | 100% |
| Yield of Extracted DMT | 68.8% | 63.8% | 76.8% |
| Reaction temperature 165°C | | | |
| | CaO | $CaO\text{-}CeO_2$ | $1CaO\text{-}4MgO\text{-}1CeO_2$ |
| Depolymerization efficiency | 100% | 100% | 100% |
| Yield of Extracted DMT | 75.8% | 79.8% | 88.5% |

What is claimed is:

1. A method for recovering natural fibers from a textile comprising polyester and natural fibers, wherein said method comprises the steps of:
   providing said textile soaked in a mixture comprising a solvent and a catalyst;
   providing and maintaining a temperature of said mixture comprising said textile within a range of 80-240° C. during depolymerization of polyester in said textile; and
   recovering natural fibers after said depolymerization,
   wherein, in said step of providing said textile soaked in said mixture, said catalyst of said mixture comprises calcium oxide.

2. The method according to claim 1, wherein said step of maintaining the temperature of said mixture comprising textile lasts until at least 20% of the polyester in said textile is depolymerized to molecules with a molecular weight lower than 600 g/mol, or at least 50% of the polyester in said textile is depolymerized to molecules with a molecular weight lower than 600 g/mol, or at least 80% of the polyester in said textile is depolymerized to molecules with a molecular weight lower than 600 g/mol.

3. The method according to claim 1, wherein said natural fibers comprise at least one of cotton fibers, viscose fibers, cellulose fibers, and regenerated cotton fibers, such as lyocell type fibers.

4. The method according to claim 3, wherein said natural fibers comprise cotton fibers.

5. The method according to claim 1, wherein said catalyst further comprises an oxide of any periodic table group 2 metal, and/or an oxide of any lanthanide metal.

6. The method according to claim 5, wherein said catalyst further comprises MgO.

7. The method according to claim 1, wherein, after said depolymerization of polyester, reaction products of said depolymerization of polyester are separated from the natural fibers, the natural fibers being present in a solid fraction.

8. The method according to claim 1, wherein the textile comprises at least 10% polyester, or at least 25% polyester, or at least 50% polyester, or at least 75% of polyester.

9. The method according to claim 1, wherein said temperature is above 80° C., or above 90° C., or above 100° C., or above 110° C., or above 120° C., or above 140° C., or above 160° C., or above 180° C.; and/or wherein said temperature is lower than 200° C., or lower than 180° C., or lower than 160° C., or lower than 140° C., or lower than 120° C., or lower than 100° C.

10. The method according to claim 1, wherein said temperature is within a range of 80-170° C., or within a range of 100-150° C.

11. The method of claim 1, wherein, in said step of maintaining said temperature of said mixture comprising said textile, said temperature is maintained for at least 10 min, or at least 20 min, or at least 30 min, or at least 40 min, or at least 50 min, or at least 60 min; and/or wherein said temperature is maintained for at most 300 min, or at most 270 min, or at most 240 min, or at most 200 min, or at most 160 min, or at most 120 min, or at most 90 min, or for at most 60 min.

12. The method according to claim 1, wherein, in said step of maintaining said temperature of said mixture comprising said textile, said temperature is maintained for 10-300 min, or for 30-240 min, or for 60-120 min.

13. The method according to claim 1, wherein said solvent comprises an alcohol or a diol.

14. The method according to claim 1, wherein said textile further comprises additional synthetic fibers.

15. The method according to claim 1, wherein said polyester comprises aromatic polyester; and wherein reaction products of said depolymerization of polyester includes at least one of dimethyl terephthalate, ethylene glycol, 1,3-propanediol, 1,4-butanediol, ethyl methyl terephthalate, dimers of the aromatic polyester, and trimers of the aromatic polyester.

16. The method according to claim 1, wherein said catalyst has a general formula CaO-xO-yO, where x is any periodic table group 2 metal and where y is any lanthanide metal.

17. The method according to claim 1, wherein said depolymerization is performed in an autoclave.

18. The method according to claim 15, wherein said method further comprises the step of:
recovering said at least one of dimethyl terephthalate, ethylene glycol, 1,3-propanediol, 1,4-butanediol, ethyl methyl terephthalate, dimers of aromatic polyester, and trimers of aromatic polyester.

19. The method according to claim 1, wherein said method further comprises the step of:
producing new textile from recovered natural fibers.

20. A recovered natural fiber obtainable by depolymerization of polyester in a textile comprising polyester and natural fibers, and recovery of natural fibers after said depolymerization.

* * * * *